(12) United States Patent
Skelton

(10) Patent No.: US 9,346,559 B1
(45) Date of Patent: *May 24, 2016

(54) AERONAUTICAL STATIC DISCHARGE DEVICE AND INDICATOR THEREIN

(71) Applicant: Grady L. Skelton, Queen Creek, AZ (US)

(72) Inventor: Grady L. Skelton, Queen Creek, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/833,117

(22) Filed: Aug. 23, 2015

Related U.S. Application Data

(63) Continuation of application No. 14/589,303, filed on Jan. 5, 2015.

(51) Int. Cl.
*B64D 45/02* (2006.01)
*G08B 5/36* (2006.01)

(52) U.S. Cl.
CPC . *B64D 45/02* (2013.01); *G08B 5/36* (2013.01)

(58) Field of Classification Search
CPC .................................. G08B 5/36; B64D 45/02
USPC ......................................................... 361/220
See application file for complete search history.

(56) References Cited

U.S. PATENT DOCUMENTS

| | | | |
|---|---|---|---|
| 3,617,805 A * | 11/1971 | Truax ..................... | B64D 45/02 361/218 |
| 4,505,421 A | 3/1985 | Gen et al. | |
| 4,590,535 A | 5/1986 | Mang | |
| 5,673,028 A | 9/1997 | Levy | |
| 5,776,371 A | 7/1998 | Parker | |
| 5,936,508 A | 8/1999 | Parker | |
| 6,008,715 A * | 12/1999 | Gottfried ............. | H01H 85/044 337/241 |
| 7,188,996 B2 | 3/2007 | Parker | |
| 7,513,682 B2 | 4/2009 | McClure et al. | |
| 7,712,431 B2 | 5/2010 | Roche | |
| 8,066,432 B2 | 11/2011 | Yang et al. | |

* cited by examiner

*Primary Examiner* — Thienvu Tran
*Assistant Examiner* — Kevin J Comber
(74) *Attorney, Agent, or Firm* — Thomas W. Galvani, P.C.; Thomas W. Galvani

(57) ABSTRACT

A static discharge device includes a body an an electrical path carried in the body for discharging static electricity. Carried on the body is visual indicia indicating a present operational status of the electrical path to discharge static electricity effectively. The visual indicia is observable to an airplane operator or technician to quickly determine the operational or non-operational status of the static discharge device.

20 Claims, 4 Drawing Sheets

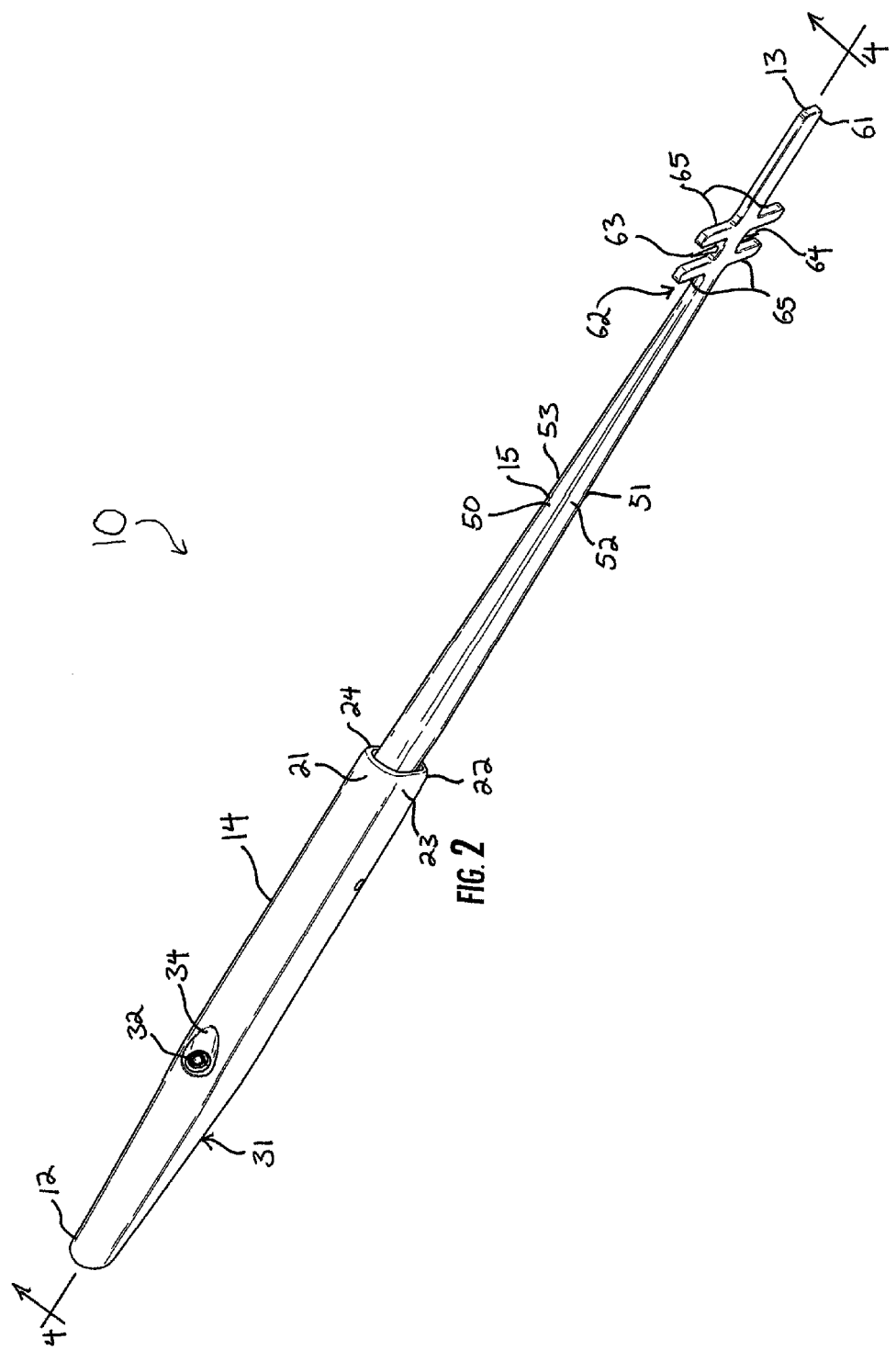

AERONAUTICAL STATIC DISCHARGE DEVICE AND INDICATOR THEREIN

CROSS-REFERENCE TO RELATED APPLICATIONS

This application is a continuation of and claims the benefit of U.S. patent application Ser. No. 14/589,303, filed Jan. 5, 2015, which is hereby incorporated by reference.

FIELD OF THE INVENTION

The present invention relates generally airplane equipment, and more particularly to equipment for discharging static electricity from an airplane.

BACKGROUND OF THE INVENTION

Aeronautical flight is a complicated orchestra of engineering requiring considerations of lift, drag, aerodynamics, electrical engineering, electronics, hydraulic controls, material choices, dynamic control, weather, environmental control, and a variety of other issues. Safety, however, is a paramount goal of all flight solutions. Innumerable mechanism on board private and commercial airplanes are in place for safety reasons primary or solely.

As an airplane travels through the air, static electricity can build on the airplane. This static electricity is created by friction between the airplane body, or "skin," and the rapid movement of air particles across that skin, much in the same way that static electricity is created by dragging one's shoes across a carpet. The electrical static normally produced during a flight is increased when the airplane flies through rain, snow, sleet, ice, or dust. Such precipitation is known as "p-static." P-static is dangerous because it reaches levels of charge high enough to affect internal electronic controls and radio operations in the airplane. Pilots can hear the effects of p-static as high-pitched whining or popping over their radio systems. When p-static reaches high enough levels, it discharges from the airplane, and in doing so, can damage the airplanes electronic and radio components. In extreme cases, p-static can destroy electronic or radio components.

Static wicks have been used for over half a century to dissipate static electricity, and p-static in particular, consistently and rapidly, to prevent the buildup of dangerous levels of static electricity on the airplane. Static wicks are electrical components typically installed on the trailing edges of the plane, such as on the wings, ailerons, and tails. Static electricity on the plane moves across the plane body to the static wick where it can be let off, or discharged, into the air safely.

Static wicks are effective at discharging static electricity when operating properly. However, like most equipment, static wicks often require replacing. Typically, there will be a dozen or so static wicks distributed across the airplane. If one or several of the static wicks is or becomes inoperable during flight, static electricity can build do unsafe levels. It is difficult, however, to determine whether a static wick is operating properly. Typically, testing the operational status of a static wick requires a technician to remove the static wick from the airplane and take it to a bench for testing with a power supply and multimeter. This process can take hours. If several static wicks have to be tested, the testing process can be extremely lengthy, resulting in increased operational costs. An improved way to determine the operational status of a static wick is needed.

SUMMARY OF THE INVENTION

A static discharge device includes visual indicia for quickly indicating for observation by a technician the present operational status of the static discharge device. The static discharge device includes a body and an electrical path carried by the body for discharging static electricity. When the static discharge device is mounted to an airplane, and the electrical path is in an operational status, the electrical path discharges static electricity from the airplane into the air effectively to prevent damage to radio, electric, and electronic components of the airplane. When the electrical path is in a non-operational status, the electrical path does not discharge static electricity from the airplane into the air effectively, and damage to the radio, electric, and electronic components of the airplane is possible. The visual indicia of the static discharge device, however, indicates the present operational status of the electrical path to inform a technician whether the static discharge device needs to be replaced: when the electrical path is in the operational status, a first color is displayed by the visual indicia. Conversely, when the electrical path is in the non-operational status, a second color is displayed which is different from the first color and easily discernible. The technician thus can quickly and easily determine whether the static discharge device should be replaced.

BRIEF DESCRIPTION OF THE DRAWINGS

Referring to the drawings:

FIG. 2 is a top perspective view of the aeronautical static discharge device of FIG. 1 in isolation;

DETAILED DESCRIPTION

Figure 1:
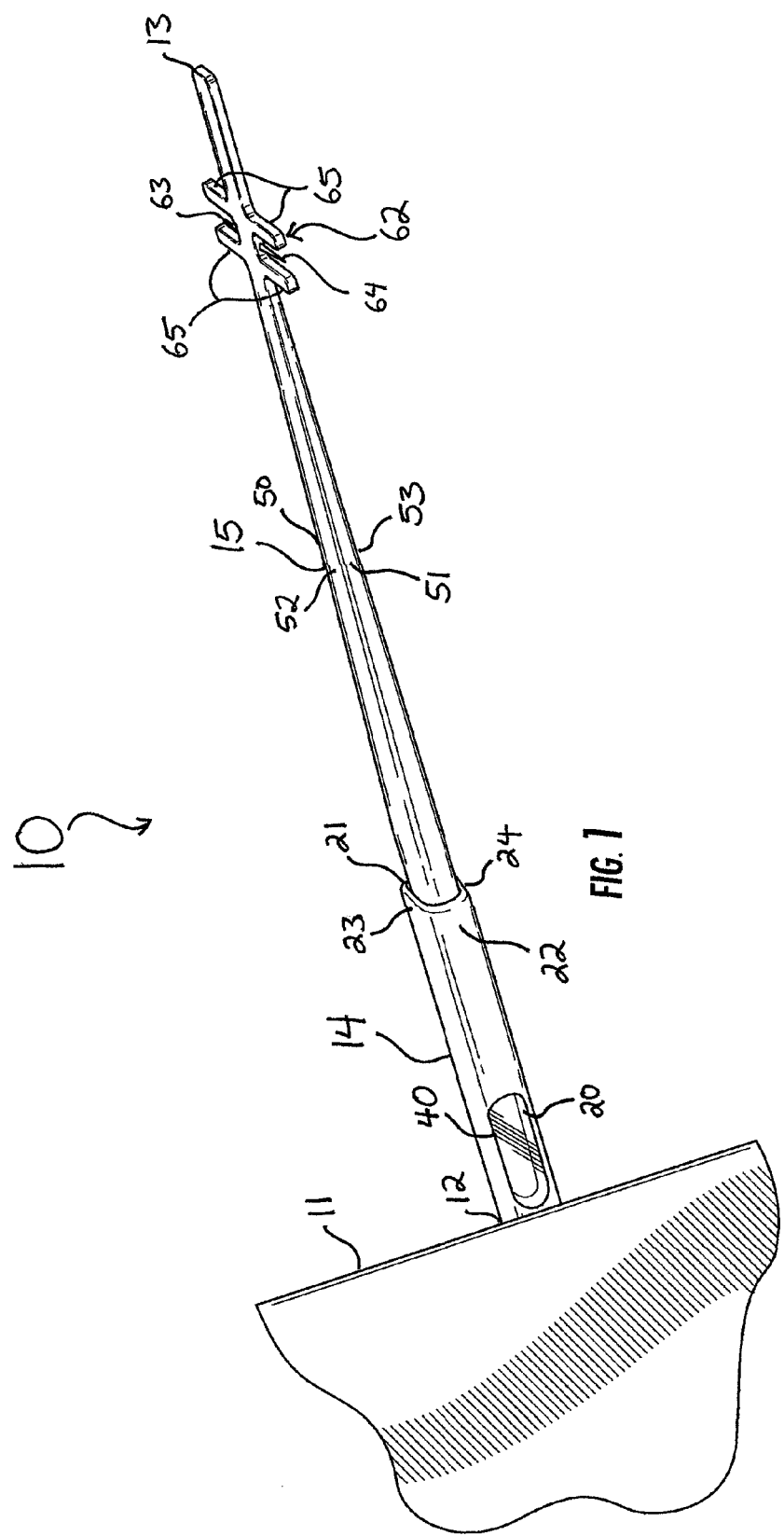
FIG. 1 is a bottom perspective view of an aeronautical static discharge device installed on a trailing edge of a wing of an airplane.

Reference now is made to the drawings, in which the same reference characters are used throughout the different figures to designate the same elements. FIG. 1 illustrates an aeronautical static discharge device 10, hereinafter referred to as a "static wick 10," installed on a trailing edge of an airplane wing 11, such as an aileron. The static wick 10 is useful for discharging static electricity accumulated across the airplane into the ambient air to prevent radio frequency interference and damage to electronic equipment aboard the airplane, and for quickly determining a present operational status of the static wick to discharge static electricity from the airplane. The static wick 10 is elongate and extends from a proximal end 12 secured to the wing 11 to an opposed distal end 13 behind the wing 11. The static wick 11 draws and conveys electricity from the wing 11 through the proximal end 12 toward the distal end 13 for discharge.

Figure 3A:
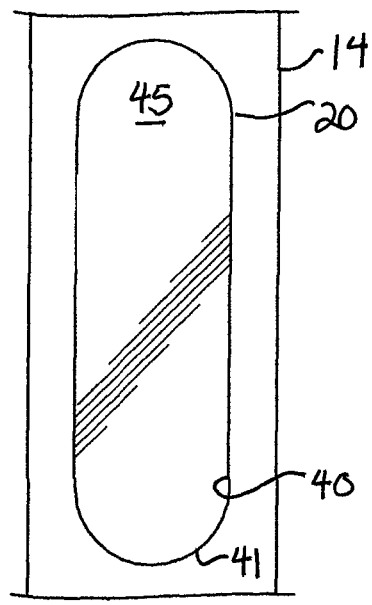
FIGS. 3A and 3B are enlarged views of windows on an underside of the aeronautical static discharge device of FIG. 1, indicating the aeronautical static discharge device operating in an operational status and a non-operational status, respectively.
Figure 3B:
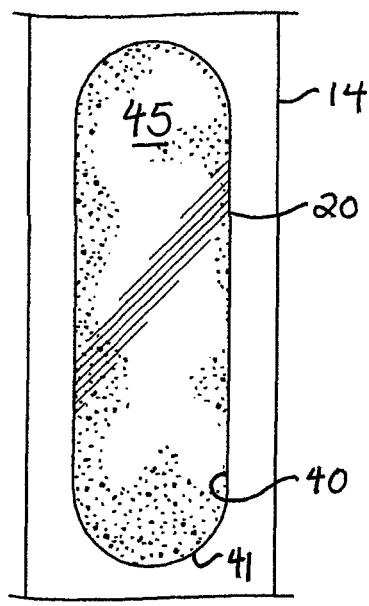

Referring now to FIGS. 1 and 2, the static wick 10 includes a base 14, a shroud 15 extending from the base 14, and a window 20 formed in the base 14 exposing a thermochromic applique which indicates a present operational status of the static wick 10 so that an airplane operator can quickly and easily observe and detect whether the static wick is in an operational status or a non-operational status. Further, and briefly, FIG. 3A illustrates how the window 20 displays the operational condition and FIG. 3B illustrates how the window 20 displays the non-operational condition.

Figure 4:
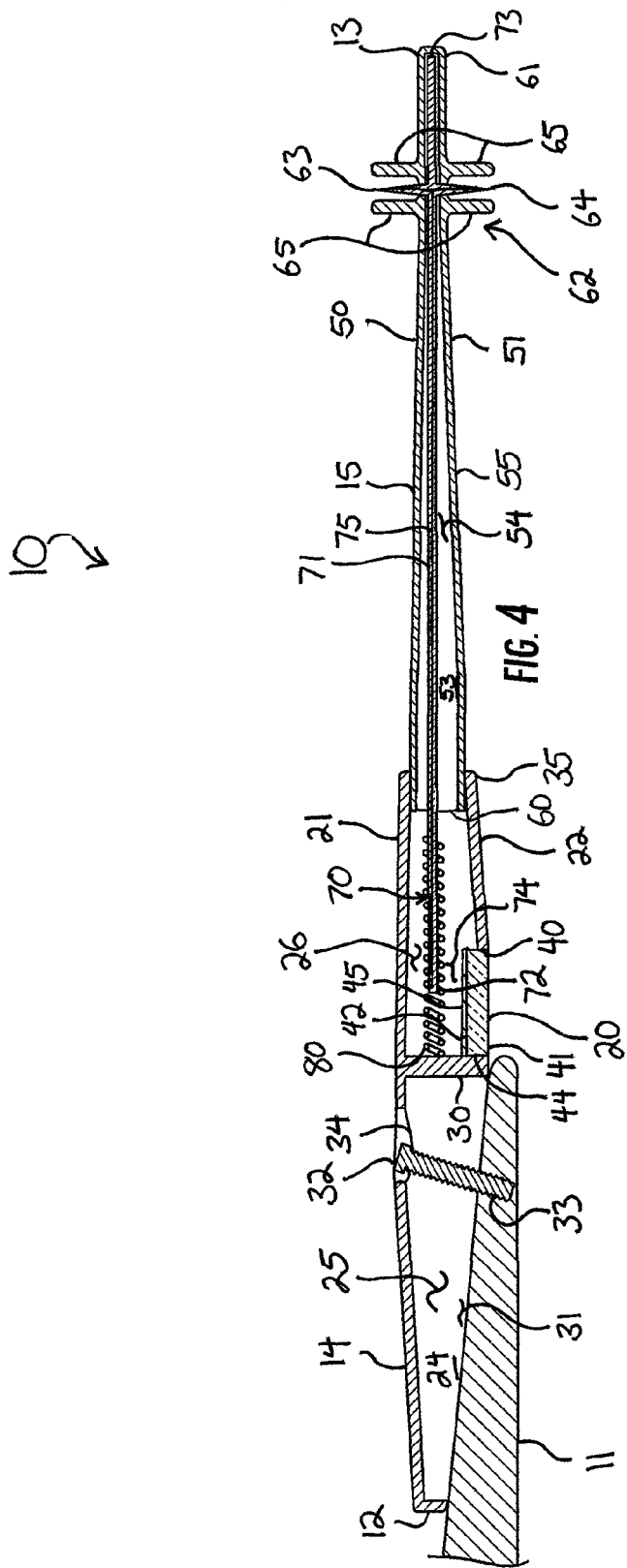
FIG. 4 is a section view of the aeronautical static discharge device of FIG. 1 taken along the line 4-4 in FIG. 2.

Turning to FIG. 4 now, a section view taken along the line 4-4 in FIG. 2 illustrates internal components of the static wick 10 applied to the wing 11. The base 14 is a generally elongate structure having a topside 21, an opposed underside 22, opposed sides 23 and 24 (shown more clearly in FIGS. 1 and 2), and two internal chambers 25 and 26 (shown in FIG. 4) separated by an internal wall 30, where the internal chamber 25 is and will be referred to as a leading internal chamber 25, and the internal chamber 26 is and will be referred to as a trailing internal chamber 26. Both the topside 21 and the underside 22 at the base 14 are convex, such that the base 14 has a generally oval-shaped cross section. Along the base 14, the edges between the topside 21 and the sides 24 and 25, and between the underside 22 and the sides 24 and 25, are radiused and smooth.

The base 14 has an axial slot 31 extending along the underside 22 which is opposed from the topside 21. The leading internal chamber 25 is bound by the topside 21, the sides 23 and 24, and the slot 31 which is received and held against the wing 11. Briefly, it is noted that the term "axial", as used herein, should be understood to mean generally aligned along or with the static wick 10, that the term "leading" should be understood to mean disposed generally toward the proximal end 12 or closer to the proximal end 12 than some reference part, and that, finally, the term "trailing" should be understood to mean disposed generally toward the distal end 13 or closer to the distal end 13 than some reference part. The base 14 is constructed of a material or combination of materials having the material characteristics of rigidity, strength, durability, and good electrical conductivity, such as a manganese-aluminum alloy.

A set screw 32 fixes and secures the static wick 10 in position on the wing 11. The set screw 32 is a short threaded screw extending obliquely through a threaded mount 34 formed in the topside 21 of the base 14 toward and into the wing 11. A socket 33 formed in the wing is sized to receive the set screw 32, such that when the set screw 32 is threadably engaged through the mount and into the socket 33, the set screw 32 is firmly engaged with the socket 33, and forms a strong and rigid fastener between the static wick 10 and the wing 11, that, together with the application of the slot 31 onto the wing 11, firmly secures the static wick 10 on the wing 11. Secured in this manner, the static wick 10 projects directly backwardly from the wing 11, and is generally aligned horizontally with the wing 11.

Referring to FIG. 4, the internal wall 30 partitions the leading internal chamber 25 from the trailing internal chamber 26 and isolates them from spatial communication with each other. The internal wall 30 extends completely from the side 24 to the side 25 and completely from the topside 21 to the underside 22. The base 14 includes an open distal end 35 opposed from the internal wall 30, and the trailing internal chamber 26 is bound by the topside 21, the underside 22, the internal wall 30, and the open distal end 35. A cutout 40 is formed through the underside 22 of the base 14 proximate to and trailing the internal wall 30. As FIG. 1 shows slightly more clearly, the cutout 40 is elongate, extends axially from the internal wall 30 toward the distal end 13 of the static wick 10, and is flanked by the sides 23 and 24, extending as it does substantially fully between the sides 24 and 25.

Referring back to FIG. 4, the cutout 40 holds the window 20. The window is a transparent plug 41 formed of a material or combination of materials having rigid, dense, transparent material characteristics, such as acrylic, bicarbonate, polycarbonate, and the like. The plug 41 has a flat upper surface 42, a convex lower surface 43, and an integral, monolithic body 44 therebetween which has a 90% clarity. The convex lower surface 43 is flush with and contiguous to the underside 22 of the base 14, so that the plug 41 neither protrudes past the underside 22 nor is receded within the base 14.

A thermochromic applique 45 is applied to the upper surface 42 of the plug 41. As the term is used herein, "thermochromic" is meant to include a substances or combination of substances which displays a first color in response to being at a first temperature and then displays at least one other color in response to being at at least another temperature different from the first temperature. In other words, thermochromic indicates that a color change occurs when the thermochromic material changes temperature. The thermochromic applique 45 is a cured state of a chemical compound which is applied to the upper surface 42 of the plug 41 in liquid form. The thermochromic applique 45 is, by volume, composed of fifty to fifty-five percent ethylcyclohexane, fifteen percent butoxyethyl acetate, seven percent bees' wax, one percent bisphenol, less than one-tenth percent formaldehyde, and the remainder as base acetone. The chemical compound, while in liquid form, is mixed to ensure a homogeneous consistency throughout. It is then applied, in liquid form, such as with a dropper or a brush, to the upper surface 42 of the plug 41 and cured, resulting in the dry, cured, finished thermochromic applique 45 having a thickness of 1.2 millimeters or less.

With reference still to FIG. 4, the shroud 15 is installed in the open distal end 35 of the base 14. The shroud 15 is a generally elongate sleeve structure having a topside 50, an opposed underside 51, opposed sides 52 and 53, and a single, long internal chamber 54 bound by a thin but rigid and strong sidewall 55. Like the base 14, along the shroud 15, both the topside 21 and the underside 22 at the base 14 are convex, such that the shroud 15 has a generally oval-shaped cross section. Along the shroud 15, the edges between the topside 21 and the sides 24 and 25, and between the underside 22 and the sides 24 and 25, are radiused and smooth. The shroud 15 has an open proximal end 60 and an opposed distal end 61; the open proximal end 60 is fit into and received by the open distal end 35 of the base 14. At the engagement between the open distal end 35 and the open proximal end 60, the base 14 and the shroud 15 have a similar cross-sectional profile, with the open proximal end 60 of the shroud 15 being just smaller in dimension than the open distal end 35 of the base. This allows the open proximal end 60 to be snug fit into the open distal end 35 of the shroud, providing a secure engagement which is further secured by the application of an adhesive between the open proximal end 60 and the open distal end 35 during assembly of the static wick 10.

A discharge point 62 is formed at the distal end 61 of the shroud 15. The discharge point 62 includes upper and lower let points 63 and 64, each flanked axially by rigid guards 65. The guards 65 are upward and downward protrusions of the sidewall 55 of the shroud 15 which protect the let points 63 and 64 from damage and protect operators from being injured by the let points 63 and 64. The let points 63 and 64 are sharp metal points extending out of the shroud 14. The let points 63 and 64 are the terminal discharge location for the static electricity which is discharged by the static wick 10, as will be explained. The let points 63 and 64 are leads to an electrical ground, acting to discharge electricity into the air. The sharpness of the tips of the let points 63 and 64 improve the ability of the static wick to discharge static electricity quickly.

The shroud 15 is constructed of a material or combination of materials having the material characteristics of rigidity, strength, durability, and poor electrical conductivity, such as a silicon phenolic polymer or other plastic. The shroud 15 thus operates to contain electricity within the internal chamber 54 as it transmits through the static wick 10.

Still referring to FIG. 4, like the base 14, the shroud 15 is hollow, having the internal chamber 54 which extends completely through the shroud 15 and is coupled in open spatial communication with the trailing internal chamber 26. An electrical path 70 is formed in the static wick 10 and extends throughout the static wick 10 from the proximal end of the static wick 10 proximate at the wing 11 to the upper and lower let points 63 and 64 at the distal end 13 of the static wick 10. The electrical path 70 is identified generally in FIG. 4 with an arrow marked with the reference character 70; the electrical path 70 includes the upper and lower let points 63 and 64 and other structure as well which communicates electricity to the let points 63 and 64. The electrical path 70 includes the internal wall 30, which is constructed of the same material or combination of materials as the base 14 and thus has good electrical conductivity. The internal wall 30 is integrally formed to the base 14 which is in contact with the wing 11, at the proximal end 12, at the slot 31, and at the engagement between the set screw 32 and the socket 33, so that the proximal end 12 and slot 31 of the base 14 are in good electrical communication with the wing 11, and thus, the internal wall 30 is also in good electrical communication with the wing 11.

The electrical path 70 includes other structure. From the internal wall 30 to the distal end 13 of the static wick, the trailing internal chamber 26 of the base 14 and the internal chamber 54 of the shroud 15 cooperate to form a single internal chamber through which a carbon tube 71 carrying a fiberglass filament 75 extends. The carbon tube 71 extends from a leading end 72, proximate to the plug 41, to a trailing end 73, proximate to the discharge point 64. The leading end 72 is disposed just above the plug 41, at a generally intermediate location axially along the plug 41, and an air gap 74 separates the plug 41 and the thermochromic applique 45 applied thereto, from the leading end 72 of the carbon tube 71. A consumable spiral-wound wire 80 is tightly wound into a spiral or helix around the carbon tube 71 proximate to the leading end 72 and extends, in a spiral wind, from the leading end 72 to the internal wall 30. The spiral-wound wire 80 is in a press-fit engagement against the internal wall 30 such that the spiral-wound wire 80 is biased into the internal wall 30 and flush against the internal wall 80 in direct contact. Further, the spiral-wound wire 80 is secured on the carbon tube 71 with a high-temperature thermally-resistant ceramic paste. The spiral-wound wire 80 is a resistor coupling the carbon tube 71 and fiberglass filament 75 in good electrical communication with the internal wall 30.

At the distal end 13 of the static wick 10 and within the shroud 15, the fiberglass filament 75 exits the trailing end 73 of the carbon tube 75 and is connected to each of the upper and lower let points 63 and 64. The let points extend through the sidewall 55 of the shroud 14 and terminate just below the ends of the guards 65.

In operation, the static wick 10 is highly effective at discharging static electricity from the airplane and at informing an operator that the static wick 10 is no longer functioning properly. Several static wings 10 will be installed on an airplane, generally distributed evenly across the trailing edges of the wings, though perhaps in other locations on an airplane. Referring to FIG. 1, when positioned properly on a wing 11, the static wing 10 presents the underside 22 downward toward the ground. An operator walking underneath performing a pre-flight check may look up at the underside 22 and see the window 20. The plug 41 in the window 20, having a transparent material characteristic, reveals the color of the applique 45 applied to the upper surface 42 of the plug 41. Referring now to FIG. 3A, the applique 45 presents a first color, such as red. FIG. 3A indicates the applique 45, visible through the transparent plug 41 in the window 20, has a first color. Red is a preferred first color because in aeronautics, the color red often signifies that an instrument, or a device for which an instrument is displaying information, is operating normally. However, one having ordinary skill in the art will readily appreciate that any desired color may be used for the first color.

As the plane flies and moves through the air, static electricity will build on the airplane. This static electricity is created by friction between the airplane body, or "skin," and the rapid movement of air particles across that skin. If the plane files through rain, snow, sleet, ice, or dust, increased static electricity, or p-static, will be formed. P-static has the potential to affect internal electronic controls and radio operations in the airplane, or even damage or destroy electronic or radio components. When the airplane is properly built so that the trailing ends of the wings are coupled in electrical communication with the rest of the airplane, the static electricity conveys through and across the airplane to the trailing ends. Static electricity tends to collect in concentration points. The static wick 10 provides such a concentration point because of its size and shape on the wing 11.

Referring now to FIG. 4, static electricity passes from the wing 11 into the base 14 which is constructed of a material or combination of materials having good electrically conductive material characteristics. The electricity moves through those locations at which the base 14 is in contact with the wing 11, including the proximal end 12, the set screw 32, the slot 31, and the internal wall 30. The electricity does not communicate through the base 14 further down the base 14 past the internal wall 39, because the base terminates in the open distal end 35, to which the non-conductive shroud 15 is coupled. Thus, electricity passes through the electrical path 70: from the internal wall 30 to the spiral-wound wire 80, which is in direct contact with the internal wall 30. The spiral-wound wire 80 is tightly wound, and formed of a combination of elements, namely 65% nickel by weight, 15% chromium by weight, and 20% iron by weight. The spiral-wound wire 80 begins to heat as electricity passe through the spiral-wound wire 80, performing like a resistor to reduce the flow of electrical current through the electrical path 70, to lower the voltage level in the electrical path 70, and to produce heat. The electricity passes through the spiral-wound wire 80 and into the carbon tube 71 and the fiberglass filament 75 carried within the carbon tube 71. The electricity passes further down the electrical path 70 by traveling down the carbon tube 71 and fiberglass filament 75 toward the distal end 61. At the let points 63 and 64, the electricity is discharged into the air. The ambient air flowing over the wing 11 is an electrical ground, and the sharp tips of the let points 63 and 64 are electrically coupled to that electrical ground and act to discharge electricity from the electrical path 70 into the air. The ambient air flowing over the wing 11 and the static wick 10 present a low voltage, and the wing 11 presents a source of high voltage, such that there is a large difference in voltages between the wing 11 and the ambient air. The static wick 10 and the electrical path 70 form a circuit coupled to the voltage source and the voltage ground, with the spiral-wound wire 80 defining a resistor in that circuit. Thus, as electricity passes from the wing 11 to the ambient air 10, the spiral-wound wire 80 begins to heat. Typically, the resistance of the spiral-wound wire 80 is between 118.57 and 121.53 Ohms, depending on the amount of p-static building on the airplane. With continued use, however, the spiral-wound wire 80 will fail, as will now be explained.

As a resistor, the spiral-wound wire 80 can endure a maximum continuous voltage load for a period of time before it fails. Further, the spiral-wound wire 80 can endure a maximum pulse voltage load for a very brief period of time before it fails; in other words, the spiral-wound wire 80 can endure a short-time overload. Failure of the spiral-wound wire 80 is defined as the inability of the electrical path 70 to discharge static electricity fast enough to prevent damage to the radio, electric, and electronic components of the airplane. This occurs when the resistance of the spiral-wound wire has reached 164.102 Ohms. At 164.102 Ohms, the spiral-wound wire provides too much resistance in the electrical path 70 to shed static electricity from the wing 11 to the ambient air, and damage to the radio, electric, and electronic components is possible. It is important to understand that failure is not the complete termination of the ability of the static wick 10 to discharge electricity, but is rather the inability of the electrical path 70 to discharge static electricity fast enough to prevent damage to the radio, electric, and electronic components of the airplane, which defines the non-operational status of the static wick 10.

As described above, the spiral-wound wire 80 is spaced apart from the thermochromic applique 45 by an air gap 74, such that the thermochromic applique 45 and the spiral-wound wire 80 are not in direct contact. The air gap 74 thus acts as a heat exchange buffer and allows heat to transfer from the spiral-wound wire 80 to the thermochromic applique 45 through convection, that is, by heating the air gap 74, and the air contained with the trailing internal chamber 26.

The thermochromic applique 45 is responsive to a heat change. The thermochromic applique 45 changes color from the first color to the second color in response to a heat change. This color change results from a change in the density of the chemical compound of the thermochromic applique 45, which is in response to the change in temperature of the thermochromic applique 45. When the thermochromic applique 45 reaches 40 degrees Celsius, the thermochromic applique begins to change color from the first color to the second color. The temperature change of the thermochromic applique 45 is due to heat radiating off of the spiral-wound wire 80 as its resistance changes due to degradation of the spiral-wound wire 80. When the resistance of the spiral-wound wire 80 reaches 136.42 Ohms, the spiral-wound wire 80 produces heat such that the thermochromic applique 45, spaced apart from the spiral-wound wire 80 by the air gap 74, heats to 40 degrees Celsius, thus initiating the color change in the thermochromic applique 45.

The thermochromic applique 45 typically changes from the first color to the second color from one of the leading and trailing ends to the opposed other of the trailing and leading ends, respectively, but may change gradually as well. When the thermochromic applique 45 reaches 74 degrees, the thermochromic applique 45 has completely changed to the second color, and is "locked" to the second color, such that the change is irreversible and the thermochromic applique 45 will not change color back to the first color. FIG. 3B shows the thermochromic applique completely changed to the second color, which is preferably yellow. Yellow is a preferred second color because the shroud 15 is preferably yellow, and the colors would match. However, one having ordinary skill in the art will readily appreciate that any desired color may be used for the second color, as long as such second color is appreciably and observably different from the first color.

Prolonged exposure of the spiral-wound wire 80 to the maximum continuous voltage load will cause the spiral-wound wire 80 to fail such that its resistance exceeds 164.102 Ohms. The spiral-wound wire 80 will remain in the operational status to operate normally (herein defined as the electrical path 70 discharging electricity at a rate sufficient to prevent damage to the radio, electric, and electronic components of the airplane) so long as the maximum continuous voltage load is not exceeded. Typically during operational status, the spiral-wound wire 80 will have a resistance of between 118.57 and 121.53 Ohms. However, prolonged exposure to the maximum continuous voltage load will eventually cause degradation and oxidation of the spiral-wound wire 80 such that its resistance rises to 164.102 Ohms, at which point the heat produced by electrical current flowing through the spiral-wound wire 80 will transfer by convection through the air gap 74 to heat the thermochromic applique 45 to 74 degrees Celsius. At this point, the thermochromic applique 45 will completely change color from the first color to the second color, and the change will be irreversible.

Sudden exposure of the spiral-wound wire 80 to a maximum pulse voltage will also cause the spiral-wound wire 80 to fail such that its resistance exceeds 164.102 Ohms. The spiral-wound wire 80 will operate normally so long as the maximum pulse voltage load is not exceeded. However, exposure to the maximum pulse voltage load for more than a few seconds will cause sudden degradation and oxidation of the spiral-wound wire 80 such that its resistance suddenly to 164.102 Ohms, and the heat produced by electrical current flowing through the spiral-wound wire 80 will transfer by convection through the air gap 74 to heat the thermochromic applique 45 to 74 degrees Celsius. At this point, the thermochromic applique 45 will completely change color from the first color to the second color, and the change will be irreversible.

Thus, as the airplane flies through the air, through clouds, through weather, through rain, snow, and lightning, the voltage load on the static wick 10 will change. The electrical path 70 may function properly for a long time. However, prolonged exposure to weather and p-static will cause the electrical path 70 to fail as described above. Further, a catastrophic event, such as a lightning strike, may cause the electrical path 70 to suddenly fail. When the electrical path fails 70, two things happen: the static wick 10 can no longer discharge electricity fast enough to prevent potential damage to the radio, electric, and electronic components of the airplane, and the thermochromic applique 45 will change from the first to the second color. When the airplane lands and a pre-flight check is performed, the operator will look up at the window 20 and see that the thermochromic applique 45 has changed from the first color to the second color. This indicates that the static wick 10 has failed and should be replaced. Replacement is easily accomplished by rotating and backing the set screw 23 out of the socket 33 in the wing 11 and removing the static wick 10, then applying a new static wick 10 and securing it similarly as before. The newly-installed static wick 10 may now operate to discharge static electricity from the airplane as it flies, and the old static wick 10 can be discarded. The entire checking and removal process takes only a few minutes.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:
1. A static wick for shedding electricity from an airplane, the static wick comprising:
   a body;

an electrical path through the body from a base to a discharge end, the electrical path including a spiral-wound conductive element; and observable, visual indicia carried by the body indicating a present operational status of the electrical path, the visual indicia being responsive to provision of heat to the visual indicia from the spiral-wound conductive element;

wherein the spiral-wound conductive element produces heat in response to degradation of the electrical path and provides said heat to the visual indicia.

2. The static wick of claim 1, wherein:
the visual indicia is a changeable color;
the visual indicia displays a first color in response to the electrical path being in an operational status characterized by the electrical path being capable of shedding electricity at a first rate sufficient to prevent effect to the airplane; and
the visual indicia displays a second color, different from the first color, in response to the electrical path being in a non-operational status characterized by the electrical path continuing to be capable of shedding electricity, but at a second rate less than the first rate.

3. The static wick of claim 2, wherein:
the electrical path has a maximum voltage load; and
the visual indicia changes from the first color to the second color in response to exposure of the electrical path to the maximum voltage load.

4. The static wick of claim 1, wherein the visual indicia has a thermochromic characteristic.

5. The static wick of claim 1, further comprising:
a window formed in the body; and
the visual indicia is visible through the window.

6. The static wick of claim 5, wherein the window is on an underside of the body.

7. The static wick of claim 1, wherein:
the visual indicia is a changeable color; and
the visual indicia changes color in response to a change in temperature of the visual indicia.

8. A static wick comprising:
a body;
an electrical path in the body including a resistor element having a first resistance;
the first resistance incrementally changes to a different, second resistance in response to application of current to the electrical path;
observable, visual indicia carried by the body indicating a present operational status of the electrical path, wherein the visual indicia changes in response to the incremental change from the first resistance to the second resistance.

9. The static wick of claim 8, wherein:
the visual indicia is a changeable color;
the visual indicia displays a first color in response to the electrical path being in an operational status; and
the visual indicia displays a second color, different from the first color, in response to the electrical path being in a non-operational status.

10. The static wick of claim 9, further comprising:
the operational status of the electrical path is defined as the resistor element having an impedance at a specified value;
the non-operational status of the electrical path is defined as the resistor element having an impedance greater than the specified value.

11. The static wick of claim 9, wherein:
the electrical path has a maximum voltage load; and
the visual indicia changes from the first color to the second color in response to exposure of the electrical path to the maximum voltage load.

12. The static wick of claim 8, further comprising:
a window formed in the body; and
the visual indicia is visible through the window.

13. The static wick of claim 12, wherein the window is on an underside of the body.

14. The static wick of claim 8, wherein:
the resistor element is disposed proximate to the visual indicia; and
the resistor element is spaced apart from the visual indicia by an air gap.

15. A static wick comprising:
a body including a base and a shroud coupled to the body;
an electrical path carried in the body, coupled in electrical communication to the base and terminating in a let point in the shroud, and including a resistor having a resistance;
a window formed in the base of the body;
observable, visual indicia carried in the window indicating a present operational status of the electrical path;
wherein the visual indicia changes visually in response to a twelve percent change in resistance of the resistor.

16. The static wick of claim 15, wherein:
the visual indicia is a changeable color;
the visual indicia displays a first color in response to the electrical path being in an operational status; and
the visual indicia displays a second color, different from the first color, in response to the electrical path being in a non-operational status.

17. The static wick of claim 16, wherein:
the electrical path has a maximum voltage load; and
the visual indicia changes from the first color to the second color in response to exposure of the electrical path to the maximum voltage load.

18. The static wick of claim 15, wherein the visual indicia has a thermochromic characteristic.

19. The static wick of claim 15, wherein the window is on an underside of the base.

20. The static wick of claim 15, wherein:
the operational status of the electrical path is defined by the ability of the electrical path to dissipate voltage at a specified rate; and
the non-operational status of the electrical path is defined by the inability of the electrical path to dissipate voltage at the specified rate.

* * * * *